United States Patent [19]
Hwang

[11] Patent Number: 5,357,286
[45] Date of Patent: Oct. 18, 1994

[54] ON-SCREEN INFORMATION SUPERIMPOSING CIRCUIT

[75] Inventor: Duk-won Hwang, Seoul, Rep. of Korea

[73] Assignee: Samsung Electronics Co., Ltd., Kyungki-do, Rep. of Korea

[21] Appl. No.: 936,307

[22] Filed: Aug. 28, 1992

[30] Foreign Application Priority Data

Aug. 30, 1991 [KR] Rep. of Korea ............... 91-15148

[51] Int. Cl.⁵ ............................................. H04N 9/74
[52] U.S. Cl. .................................... 348/589; 348/569
[58] Field of Search ............... 358/160, 183, 188, 22, 358/22 PIP, 22 C, 22 CK, 21 R, 31, 142; 370/721, 725; H04N 9/74, 5/262, 5/272

[56] References Cited

U.S. PATENT DOCUMENTS

| | | | |
|---|---|---|---|
| 4,777,531 | 10/1988 | Hakamada et al. | 358/183 |
| 4,811,085 | 3/1989 | Idei et al. | 358/22 PIP |
| 4,855,833 | 8/1989 | Kageyama et al. | 358/183 |
| 5,012,328 | 4/1991 | Ishiguro | 358/160 |

FOREIGN PATENT DOCUMENTS 0006717  1/1979  Japan ..................... H04N 5/22

Primary Examiner—Victor R. Kostak
Assistant Examiner—Nathan J. Flynn
Attorney, Agent, or Firm—Sughrue, Mion, Zinn, Macpeak & Seas

[57] ABSTRACT

An on-screen information superimposing circuit including an A/D converter for converting color signals and a luminance signal output from a video signal source into digital signals, an on-screen information generator for detecting on-screen information signal made of the color signals according to the luminance signal output from the A/D converter, storing the on-screen information, and outputting the stored color signals according to a read control signal, and a D/A converter for converting the on-screen information output from the on-screen information generator into an analog signal so as to be superimposed on another signal output from the video signal source, so as to reproduce the color signal of the on-screen information using the original color signal.

8 Claims, 3 Drawing Sheets

ON-SCREEN INFORMATION SUPERIMPOSING CIRCUIT

BACKGROUND OF THE INVENTION

The present invention relates to an on-screen information superimposing circuit for video signal processors, and more particularly to an on-screen information superimposing circuit in which the color signal of the on-screen information is superimposed using the color signal supplied from a video signal source.

Usually, video signal processors, which may include camcorders, video cassette recorders and so on, are composed of a recorder which records a composite video signal applied via an input onto a recording medium and a reproducer which displays a composite video signal applied via an input onto a picture display. Here, the input is in the form of a camera, a tuner circuit, or an external signal input jack connected to the output of an external system through which a composite signal is provided. Such a video signal processor has an on-screen information superimposing function to display desired on-screen information such as characters or patterns on a predetermined region of a main screen. So far, on-screen information has been formed using a luminance signal output from a video signal source (for example, a video camera) and the color signal of the on-screen information has been formed with a unicolor signal selected by a user.

In other words, in the conventional method, as shown in FIG. 1, on-screen information formed with a luminance signal supplied from a video signal source 10 is superimposed onto a main video signal to form the composite video signal. Hereinbelow, FIG. 1 is described in more detail.

As with the aforementioned input, likewise, video signal source 10 may be constructed so as to, upon input from an external system, process a video signal into a composite video signal and separate the video signal into a color signal C and a luminance signal Y. FIG. 1 assumes the video signal source 10 to be a camera. The color signal output from a video signal source 10 is applied to a first contact point S1 of a first control switch SW1 of a selector 20, and a luminance signal is applied to an A/D converter 50 as well as to a first contact point S1 of a second control switch SW2 of selector 20. A/D converter 50 converts the applied luminance signal into a digital signal and outputs it.

Here, if subject matter photographed via video signal source 10 is supposed to be used as on-screen information, a user applied a control signal to an on-screen information generator 60 via a key input 70 so that the luminance signal output from video signal source 10 is detected as the on-screen information signal.

In on-screen information generator 60, when the above control signal from key input 70 is applied to controller 61, the controller outputs a write control signal to store (or write) the digital signal output from A/D converter 50 in a memory 62. Here, memory 62 contains a readable and writable memory device. Controller 61 may be a controller only for generation of on-screen information or a microprocessor for controlling the overall function of the video signal processor. Controller 61 also controls the switching operation of selector 20. More specifically, when the information stored in memory 62 is not to be read out, in other words, when the on-screen information is not to be displayed or is not to be written on a medium, controller 61 controls selector 20 to switch first and second switches SW1 and SW2 of selector 20 to their respective first contact points S1. Thus, color signal C and luminance signal Y output directly from video signal source 10 are applied to a matrix 30. Matrix 30 is constructed to extract the R-Y and B-Y color difference signals from applied color signal C and luminance signal Y. Color signal C is composed of the three primary color signals of R, G, and B.

Meanwhile, when the information stored in memory 62 is to be read out, according to an on-screen information display control command issued by a user via a user key input, controller 61 outputs a read control signal to memory 62, a control signal for switching first and second control switches SW1 and SW2 of selector 20 to their respective second contact points S2, and a control signal to color generator 63 for outputting the color signal of the on-screen information to contact point S2 of switch SW1 of selector 20. Here, color generator 63 is constructed to have a maximum of eight colors and the color selection is carried out by the user via key input 70. Color generator 63 is capable of outputting only one of the eight colors at a time. The color consists of a pseudo-color signal. The user selects which one of the eight colors will be output.

Memory 62 outputs the stored luminance signal by the read control signal of controller 61 to a D/A converter 80. D/A converter 80 converts the applied signal to an analog signal to output it to second contact point S2 of second control switch SW2. Second control switch SW2 is switched to its second contact point S2 to send the output of D/A converter 80 to matrix 30. First control switch SW1 transmits the color signal output from color generator 63 to matrix 30. Matrix 30 outputs the two color difference signals and luminance signal according to the same operation as above, and outputs a composite video signal to a display (not shown) or to a writing medium via encoder 40. Here, when applied to the writing medium, the composite video signal passes through a written signal processor (not shown).

As described above, the conventional on-screen superimposing circuit forms on-screen information by using the luminance signal of a signal to be processed as the on-screen information among the composite video signals supplied via video signal source 10 (a camera), and superimposes the on-screen information signal on a main screen by switching selector 20. Here, due to the fact that pseudo-color signals are used, the on-screen information can be displayed using only one color. This is undesirable since a plurality of colors would produce a much more interesting and informative picture.

SUMMARY OF THE INVENTION

Therefore, it is an object of the present invention to provide an on-screen information superimposing circuit which superimposes an on-screen information's color signal by using a color signal supplied from a video signal. In this way, a plurality of colors can be used to form the on-screen superimposed picture.

To accomplish the object of the present invention, there is provided an on-screen information superimposing circuit used for a video signal processor including a video signal source composed of a video signal reproducer or a camera for separating and outputting color signals and a luminance signal, which comprises: an A/D converter for converting and outputting the color signals and luminance signal output from the video signal source into digital signals; an on-screen information generator for detecting on-screen information made of the color signals according to the digital luminance signal output from the A/D converter, storing the information, and outputting the stored color signals according to a read control signal, a D/A converter for converting the on-screen information output from the on-screen information generator into an analog signal so as to be superimposed on a main picture signal; and a key input for providing a control signal which controls the storing and reading out operations to the on-screen information generator.

In order to use a color signal supplied from the video signal source as a color signal for on-screen information, the on-screen information superimposing circuit of the present invention stores the luminance signal and color signal of a signal detected as an on-screen information signal among signals output from the video signal source, in respective regions in a memory. Then, when an on-screen information generating control signal is output via the key input, the luminance signal and color signal stored in the memory are read out to be superimposed on a specific region of a video signal output from the video signal source.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
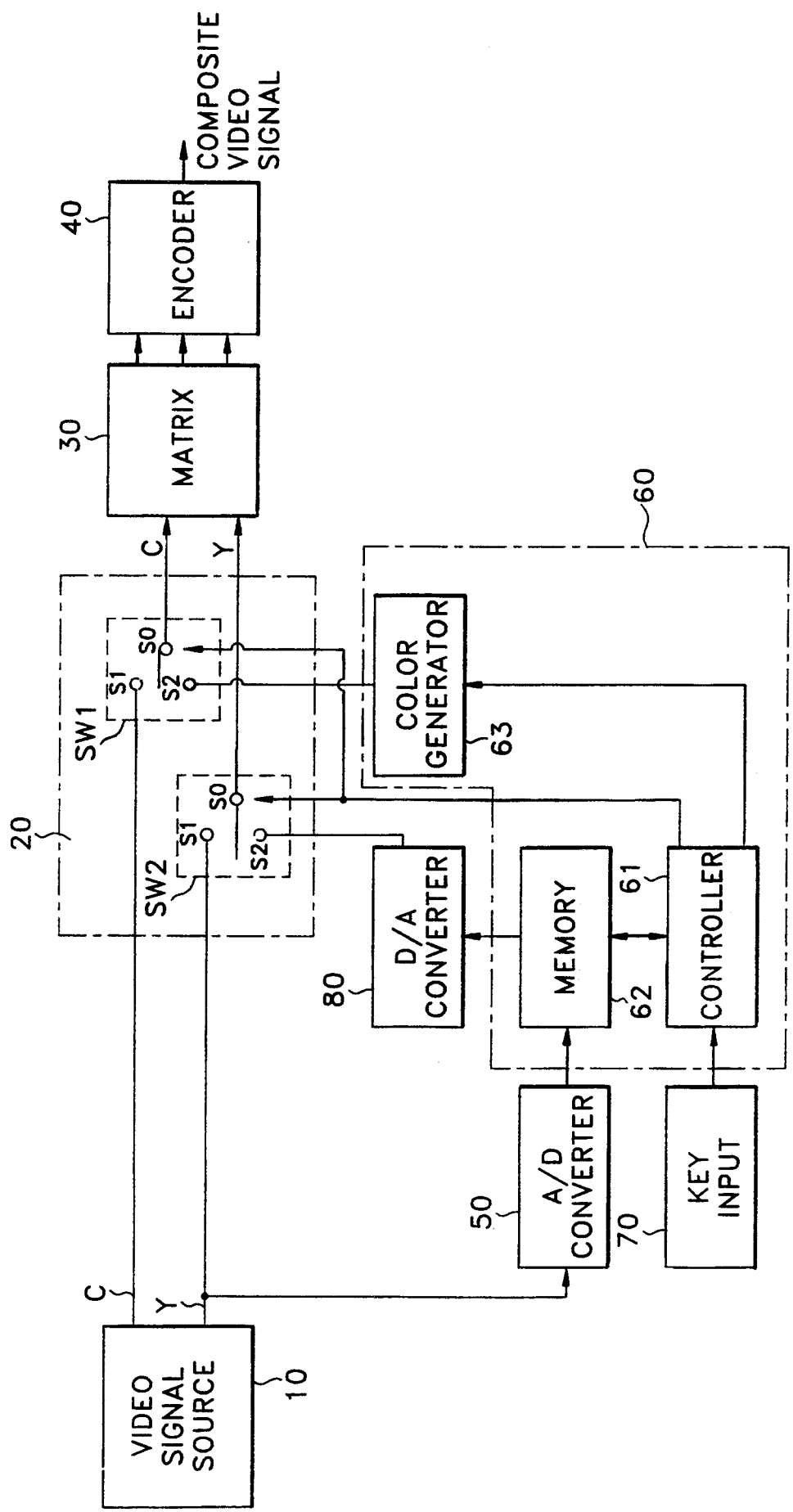
FIG. 1 is a block diagram of a conventional on-screen information superimposing circuit.
Figure 2:
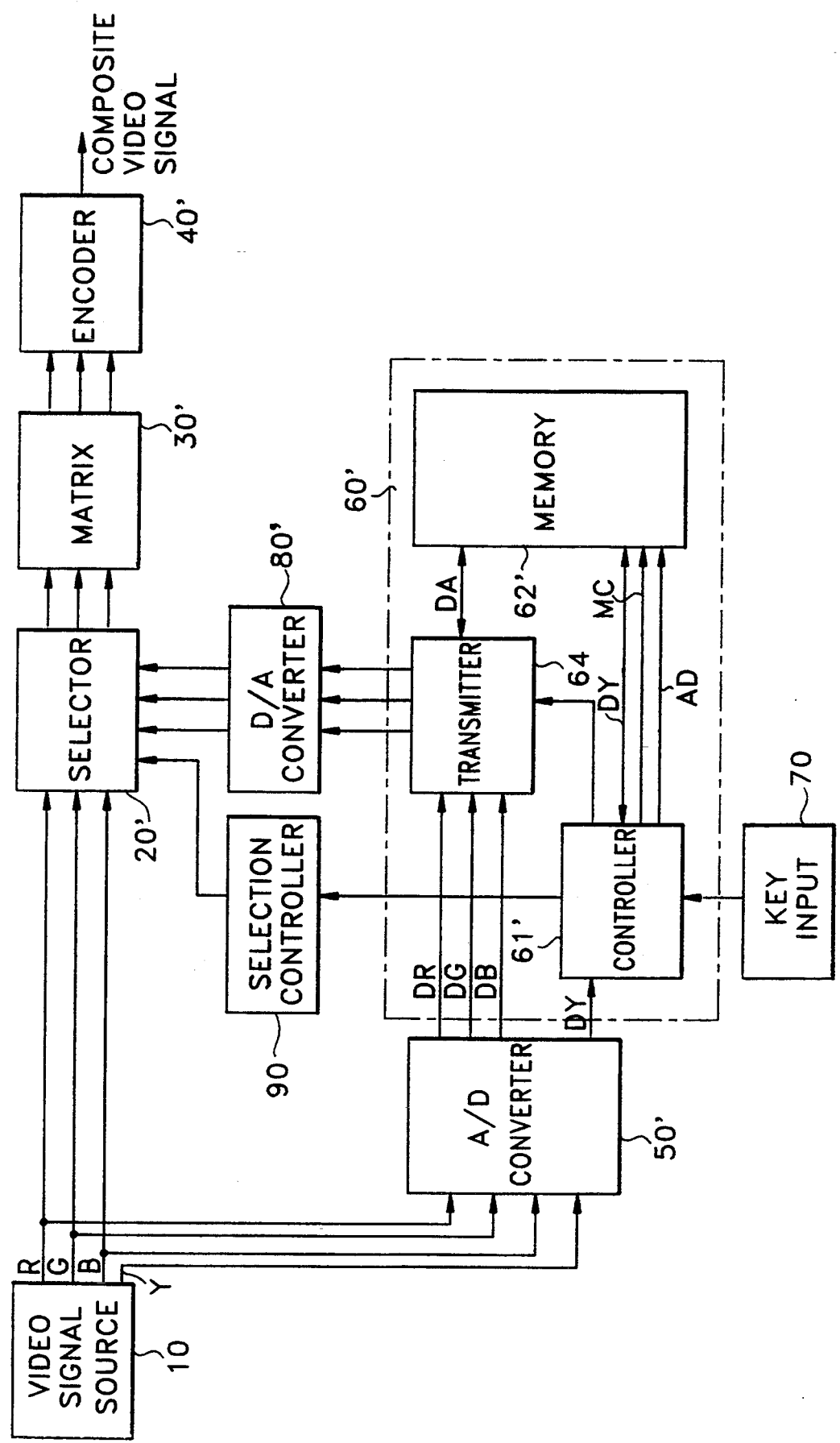
FIG. 2 is a block diagram of an on-screen information superimposing circuit according to the present invention.

FIG. 2 illustrates an on-screen information superimposing circuit of the present invention adopted in a video signal processor which uses a camera as a video signal source 10, similar to that shown in FIG. 1.

Referring to FIG. 2, the present invention comprises video signal source 10 in the form of a camera or a video signal reproducer (as in FIG. 1), an A/D converter 50' which receives luminance signal Y and color signals R, G and B output from video signal source 10, an on-screen information generator 60' which receives digital luminance signal DY and digital color signals DR, DG and DB output from A/D converter 50' a key input 70 for applying user's control commands and information to on-screen information generator 60', a selection controller 90 which receives an on-screen information superimposing control signal output from on-screen information generator 60', a D/A converter 80' which receives digital color signals DR, DG and DB output from on-screen information 60', a selector 20' which receives color signals R, G and B output from video signal source 10 and the signals output from D/A converter 80' and selects output signals from the received signals according to a signal output from selection controller 90, a matrix 30' which receives color signals R, G and B output from selector 20', and an encoder 40 which receives the output signals from matrix 30' and outputs a composite video signal to a display (as shown) or to a recorder signal processor (not shown).

On-screen information generator 60' comprises a controller 61' which receives luminance signal DY output from A/D converter 50' and the above-mentioned control signal output from key input 70, a transmitter 64 which receives digital color signals DR, DG and DB output from A/D converter 50' and a signal DA (reference designation DA represents digital data including the DR, DG and DB signals) read out from a later-mentioned memory 62' and sends the output signals from A/D converter 50' to memory 62' or sends the signal output from memory 62' to D/A converter 80' according to the control signal output from controller 61', and a memory 62' which receives/outputs signal DA from/to transmitter 64 and digital luminance signal DY from/to controller 61' and receives a memory control signal MC and an address control signal AD from controller 61'.

Figure 3:
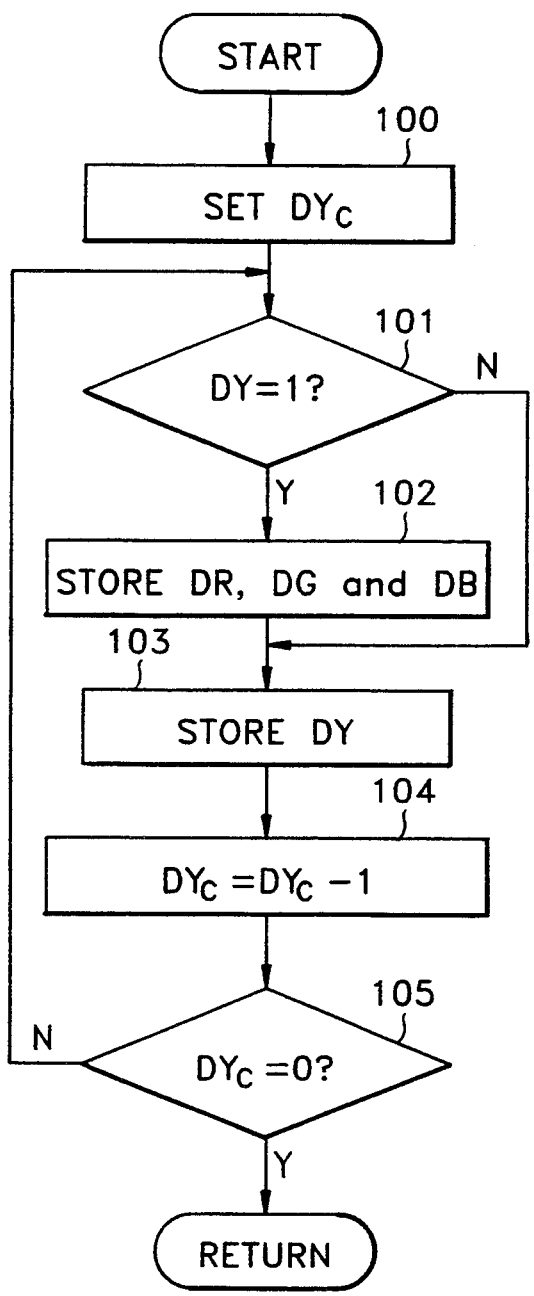
FIG. 3 is a flowchart illustrating a method for storing on-screen information in the memory shown in FIG. 2.

FIG. 3 illustrates a method wherein controller 61' stores on-screen information in memory 62' shown in FIG. 2. Here, step 100 sets a counting value ($DY_C$) used in counting digital luminance signal DY applied from A/D converter 50' to controller 61' to a predetermined value. $DY_C$ can be, for example, the total number of pixels on a screen. Step 101 checks the data form of presently applied digital luminance signal DY. That is, it is checked whether the DY signal is a binary 0 or a 1. Steps 102 and 103 store digital color signals DR, DG and DB and digital luminance DY in memory 62' if DY=1, and step 103 stores only DY if DY=0. Steps 104 and 105 decrease the counting value set in step 100, to control the repeated performance of steps 101 to 104 until the DY counting value has reached zero and is reset.

Figure 4:
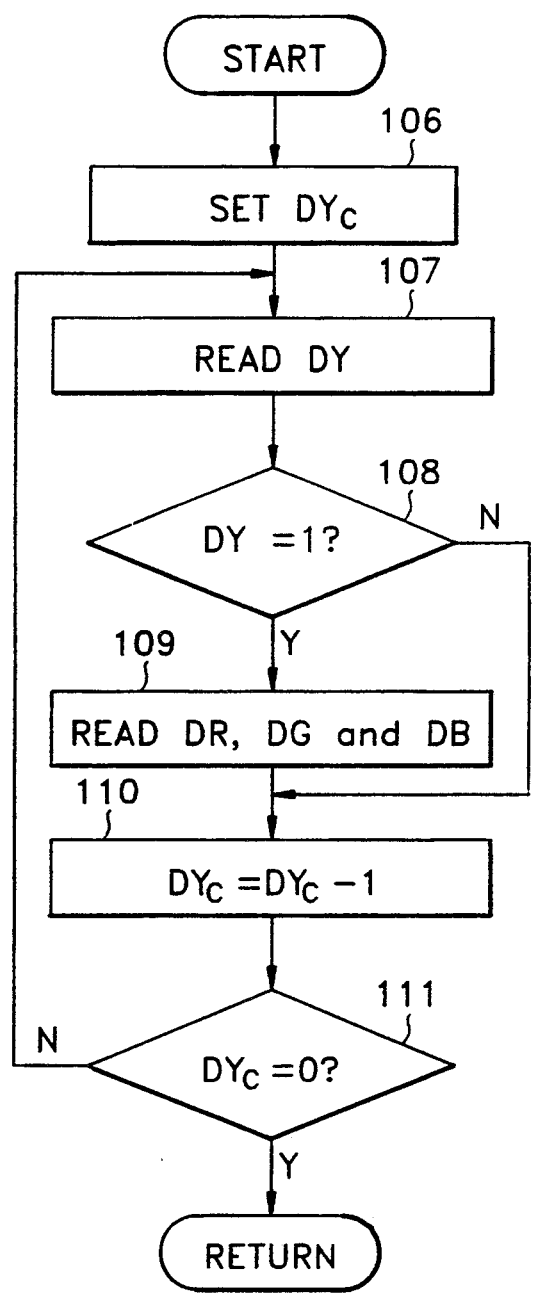
FIG. 4 is a flowchart illustrating a method for reading out on-screen information from the memory shown in FIG. 2.

FIG. 4 illustrates a method wherein controller 61' reads out the on-screen information stored in memory 62' according to the method of FIG. 3. Here, step 106 sets the same counting value ($DY_C$) as that in step 100 of FIG. 3. Steps 107 and 108 read out digital luminance signal DY stored in memory 62' and checks the data form of the digital luminance signal. Step 109 reads out the color signals if DY is a binary 1. If DY=0, the color signals are not read out, as shown in FIG. 4. Steps 110 and 111 decrease the counting value set in step 106 as in steps 104 and 105 of FIGS. 3, to control the repeated performance of steps 107 to 110 until the counting value has reached zero and is reset.

Now, the operation of FIG. 2 will be described with reference to FIGS. 3 and 4.

Video signal source 10 and encoder 40 are the same as those in FIG. 1, and their detailed description is omitted.

First, when the output signal from video signal source 10 (a camera) is not used as the on-screen information, according to a user's control command via key input 70, controller 61' controls selector 20' via selection controller 90 so that selector 20' outputs color signals R, G and B output from video signal source 10. Since the signals output from selector 20' are only color signals R, G and B and no luminance signal is applied, contrary to the matrix 30 shown in FIG. 1, matrix 30' extracts luminance signal Y and two color difference signals R-Y and B-Y from the applied color signals R, G and B, and outputs them to encoder 40. Here, a method of detecting luminance Y from color signals R, G an B is performed according to the well-known equation $Y = 0.59G + 0.30R + 0.11B$. The operation of encoder 40 is the same as that of FIG. 1.

When the signal output from video signal source 10 is to be used as the on-screen information, A/D converter 50' converts color signals R, G and B and luminance signal Y applied from video signal source 10 into digital signals and outputs them.

Controller 61' detects the digital luminance signal DY output from A/D converter 50' according to an on-screen information detecting command applied from key input 70 by a user. Here, the inputtable period $DY_C$ of the DY signal applied to a DY input of controller 61' is determined by the counting value set in a DY counter register of controller 61' (in step 100). More specifically, assuming that the DY signal is detected by screens (frames), in order to input one entire screen of DY signals to the DY input of controller 61', the counting value $DY_C$ is set in the DY counter register, to equal the number of pixels corresponding to one screen. Whenever one pixel of data is applied to the DY input, the counting value $DY_C$ is repeatedly decreased by one until the counting value becomes zero. When detecting the input of the DY signal from A/D converter 50' to the DY input, controller 61' checks the data form of the applied DY signal (in step 101). This means that it is checked whether the applied DY signal is "0" or "1," since the data is in the form of binary information. Here, a region where the DY signal is "1" is assumed to be where on-screen information is to be loaded on a screen. If the signal applied to the DY input is "1", controller 61' outputs a control signal for setting memory 62' in a storing mode (or writing mode) via an MC control port, and applies a control signal to transmitter 64. Transmitter 64 transmits the DR, DG and DB signals output from A/D converter 50' to memory 62' according to the control signal of controller 61, so that the memory 62' stores the transmitted signals (in step 102) and DY information corresponding to the color signals (in step 103).

If the data form of the DY signal applied from A/D converter 50' is "0", the storing mode of memory 62' for the DR, DG and DB signals is released, and simultaneously, the path transmitting the color signals from transmitter 64 to memory 62 is locked, and instead, only the corresponding DY signal is stored in memory 62' (in step 103). Here, DY, DR, DG and DB have their own respective storage regions in memory 62'.

Controller 61' controls transmitter 64 and memory 62' according to the DY signal output from A/D converter 50' and simultaneously, decreases the DY counting value $DY_C$ by one in the DY counting register of controller 61' according to the detection of the DY signal (in step 104). When the decreased value is "0", controller 61' is in a standby mode. If the decreased value is not "0", steps 101 to 104 are repeated (in step 105).

According to the above operation, the information stored in memory 62' contains the data form of one screen of the luminance signal and the color signals DR, DG and DB corresponding to the regions occupied by the characters or figures taken as on-screen information. Memory 62' can store information about a plurality of screens of on-screen information via the above-described steps.

Now, the superposition of the on-screen information stored in memory 62' onto the signal applied via video signal source 10 will be described below. First, a control signal for selecting desired on-screen information from among the plurality of on-screen information stored according to the above-described steps, is applied from key input 70 to controller 61'.

Controller 61' sets the DY counter register having the same counting value $DY_C$ as that used during the storage control of memory 62' according to the control signal applied from key input 70 (in step 106), and reads out the DY data of a selected screen overlay amongst the on-screen information stored in memory 62' (in step 107). The data form of the detected DY signal is detected (in step 108), similar to the storage operation. If the DY data is "1", which signifies a region where on-screen information is present, controller 61' outputs a read control signal to memory 62' and simultaneously, outputs to transmitter 64 a control signal for transmitting the color signals DR, DG and DB read out from memory 62' to D/A converter 80' (in step 109). If the DY data is "0", memory 62' and transmitter 64 are disabled. During this operation, the DY counter register decreases its counting value $DY_C$ by one whenever the DY value is detected (in step 110). When the counting value $DY_C$ decreased by one becomes "0", the system is in a standby mode, and if the value is not 0, steps 107 to 110 are repeated.

D/A converter 80' converts the applied color signals DR, DG and DB into analog signals and sends them to selector 20'. Simultaneously, whenever data is output from D/A converter 80', controller 61' applies a control signal to selection controller 90 so that selector 20' outputs the output of D/A converter 80' to matrix 30' instead of the output video signal source 10. The operation of matrix 30' and encoder 40 is the same as the aforementioned.

As described above in detail, the on-screen information superimposing circuit of the present invention is advantageous in processing a signal output from a video signal source as on-screen information, by storing and reading out the color signal of the signal output from the video signal source so as to reproduce the color signal of the on-screen information using the original color signal.

What is claimed is:

1. An on-screen information superimposing circuit which superimposes on-screen information onto a main picture signal for a video signal processor including a video signal source for separating and outputting color signals and a luminance signal, said circuit comprising:
    an A/D converter means for converting and outputting said color signals and luminance signal outputted from said video signal source into digital color signals and a digital luminance signal;
    an on-screen information generator means for detecting on-screen information made of said digital color signals according to the digital luminance signal output from said A/D converter, for storing the detected on-screen information, and for outputting the stored information; and
    a D/A converter means for converting said on-screen information output from said on-screen information generator means into an analog signal so as to be superimposed on said main picture signal.

2. An on-screen information superimposing circuit as claimed in claim 1, wherein said on-screen information generator means comprises:

a memory means for storing and reading out said digital color signals and a digital luminance signal output from said A/D converter means;

a controller means for controlling the setting of a storing or a reading out mode of said memory means according to a control signal from a key input; and a transmitter means for, when said memory means is set to the storing mode according to the control of said controller means, transmitting said color signals output from said A/D converter means to said memory means, and when said memory means is set to the reading mode, transmitting said digital color signals from said memory means to said D/A converter means.

3. An on-screen information superimposing circuit as claimed in claim 2, wherein said controller means is further for detecting a value of the digital luminance signal output from said A/D converter means, and controlling said memory means to store said digital color signals according to the detected digital luminance signal value.

4. An on-screen information superimposing circuit as claimed in claim 3, wherein said controller means is further for storing the detected digital luminance signal value in a region of said memory means, and during the control of reading, controlling the reading out of said digital color signals stored in said memory means according to the digital luminance signal value stored in said memory means.

5. An on-screen information superimposing circuit as claimed in claim 2 further comprising a selector means for selectively outputting the output signals of said video signal source and D/A converter means according to a control signal of said controller so as to superimpose the on-screen information on a output signal of said video signal source.

6. An on-screen information superimposing circuit as claimed in claim 2, wherein said memory means is further for storing at least one screen of on-screen information.

7. A method of superimposing sub-information onto a main picture signal comprising steps of:
   outputting analog color signals and an analog luminance signal from a video signal source;
   converting the outputted signals to digital signals;
   storing the digital signals in a memory;
   reading digital signals corresponding to said analog color signals out of said memory based on the contents of digital signals corresponding to said analog luminance signal; and
   superimposing said digital signals read out of said memory onto said main picture signal as said sub-information.

8. A method according to claim 7 wherein said storing step involves counting a number of digital signals corresponding to said luminance signal.

* * * * *